Jan. 7, 1964  D. W. ENOCH ETAL  3,116,703
LOAF COILING BREAD MOLDING MACHINE
Filed Sept. 1, 1960  6 Sheets-Sheet 2
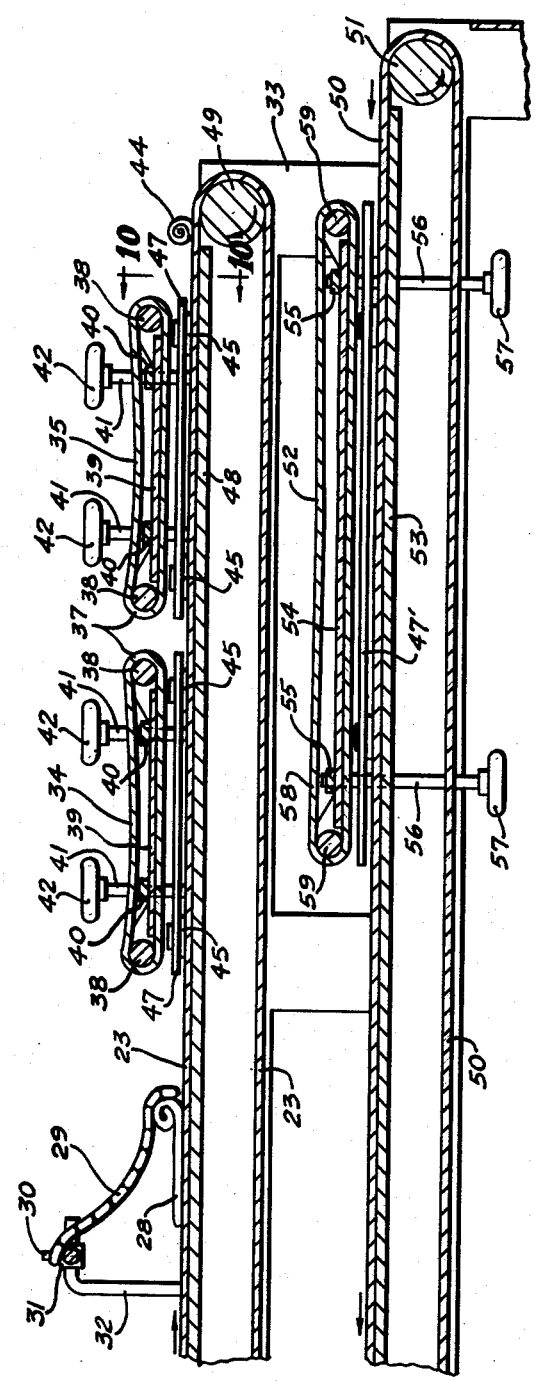
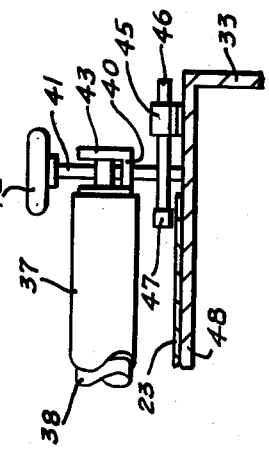
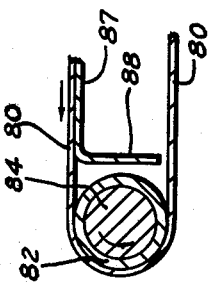
INVENTORS
DUARD W. ENOCH
BY GERALD L. SCOTT
MELVIN M. HUBER
CLARENCE A. KIEFFABER
by Alfred R. Fuchs ATTORNEY

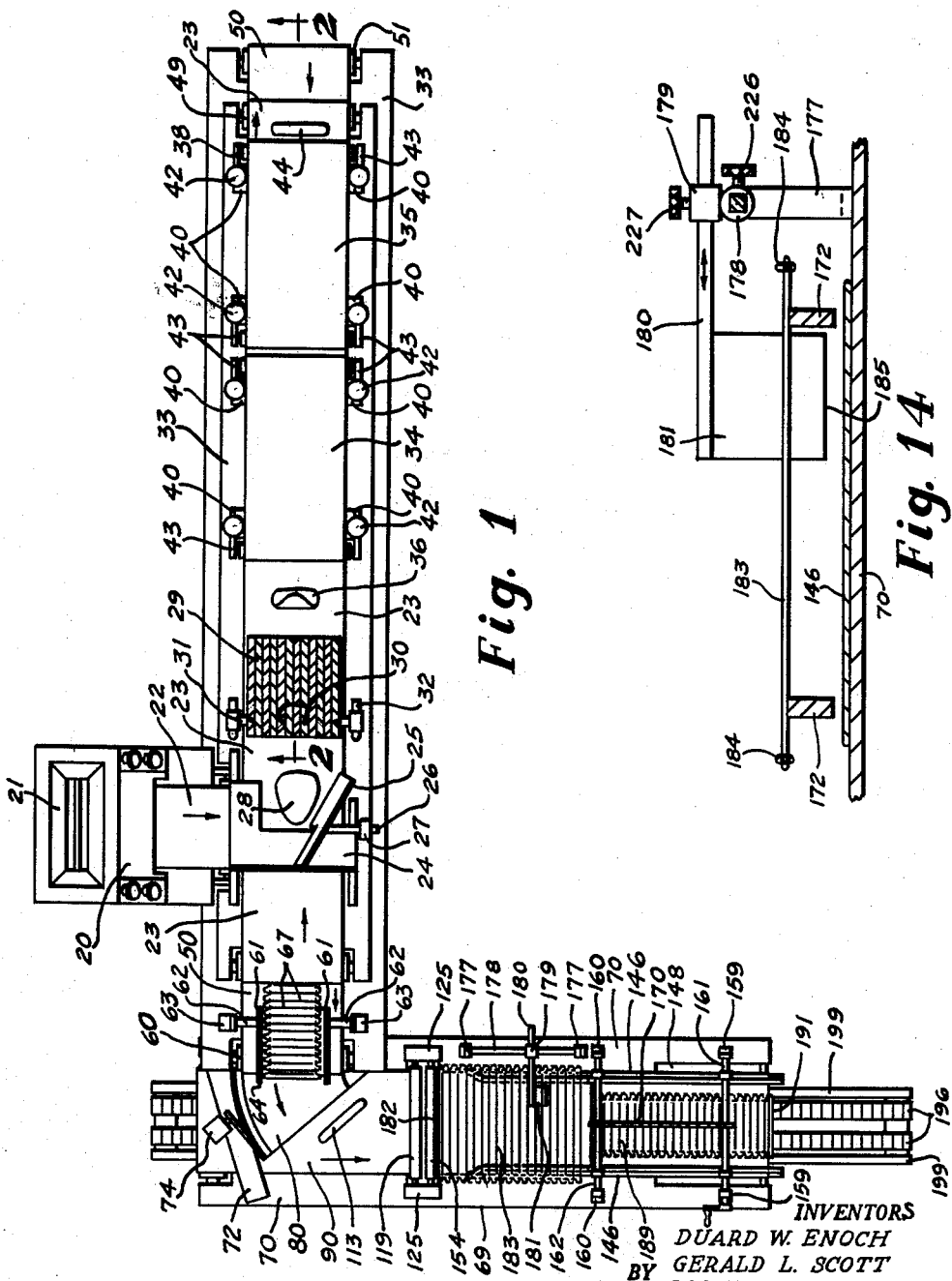

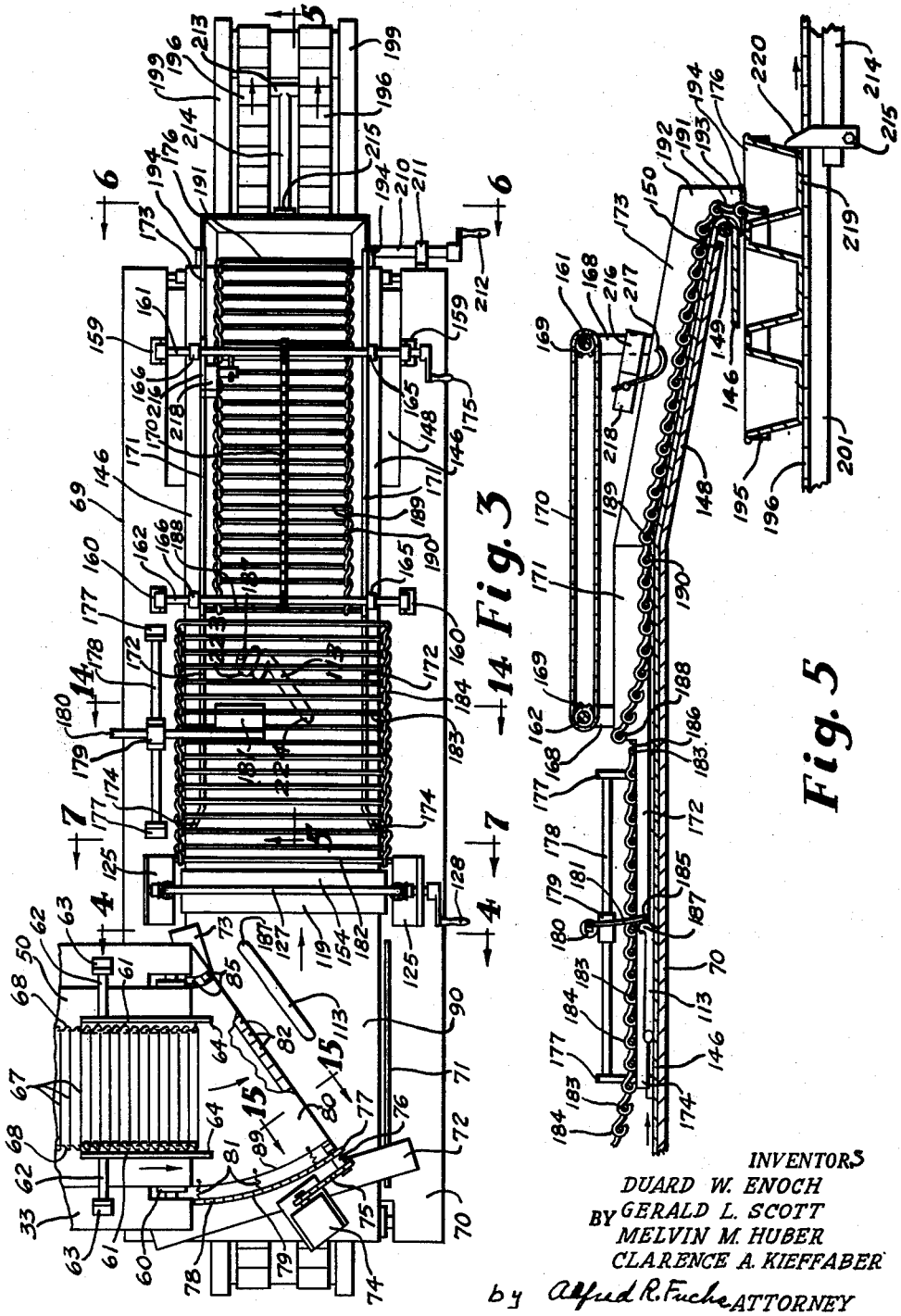

Jan. 7, 1964   D. W. ENOCH ETAL   3,116,703
LOAF COILING BREAD MOLDING MACHINE
Filed Sept. 1, 1960   6 Sheets-Sheet 4

INVENTORS
DUARD W. ENOCH
BY GERALD L. SCOTT
MELVIN M. HUBER
CLARENCE A. KIEFFABER
by Alfred R. Fuchs ATTORNEY Jan. 7, 1964 D. W. ENOCH ETAL 3,116,703
LOAF COILING BREAD MOLDING MACHINE
Filed Sept. 1, 1960 6 Sheets-Sheet 5
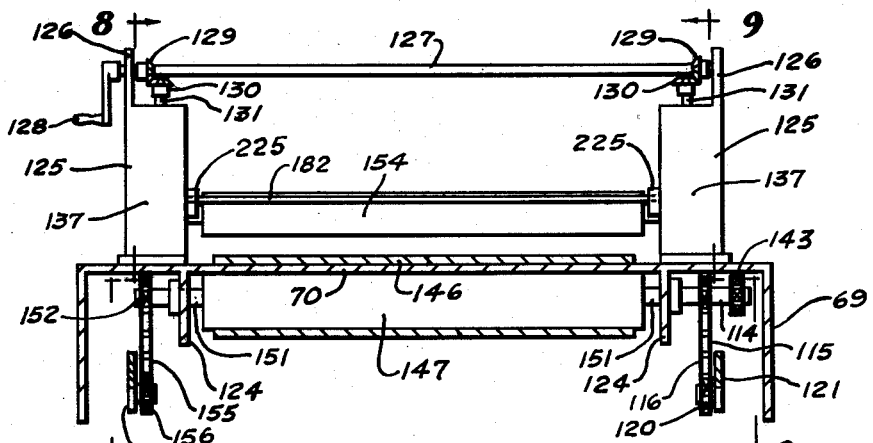
Fig. 7
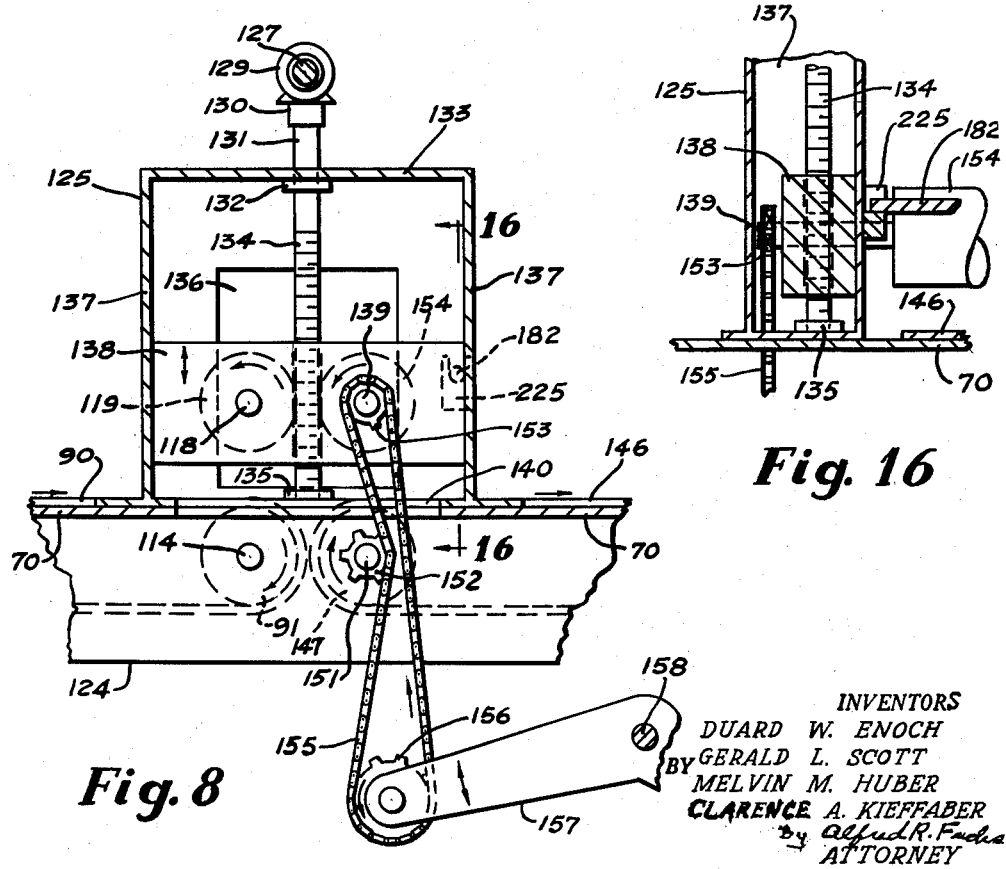
Fig. 8
Fig. 16
INVENTORS
DUARD W. ENOCH
GERALD L. SCOTT
MELVIN M. HUBER
CLARENCE A. KIEFFABER
BY Alfred R. Fuchs
ATTORNEY Jan. 7, 1964 D. W. ENOCH ETAL 3,116,703
LOAF COILING BREAD MOLDING MACHINE
Filed Sept. 1, 1960 6 Sheets-Sheet 6

INVENTORS
DUARD W. ENOCH
BY GERALD L. SCOTT
MELVIN M. HUBER
CLARENCE A. KIEFFABER
by Alfred R. Fuchs ATTORNEY

United States Patent Office 3,116,703
Patented Jan. 7, 1964

3,116,703
LOAF COILING BREAD MOLDING MACHINE
Duard W. Enoch and Gerald L. Scott, Kansas City, Mo., and Melvin M. Huber, Prairie Village, and Clarence A. Kieffaber, Overland Park, Kans., assignors to Interstate Bakeries Corporation, Kansas City, Mo., a corporation of Delaware
Filed Sept. 1, 1960, Ser. No. 53,557
19 Claims. (Cl. 107—4)

Our invention relates to bread molding machines, and more particularly to loaf coiling bread molding machines.

In the machine molding of bread it has been customary for many years to roll the rounded piece of dough, that is produced by the rounder, into a sheet and coiling the sheet up on itself into a scroll to form a molded loaf. The scroll formed in this manner has been customarily compacted in some manner, as under a pressure board, to form a unitary mass of the scroll of dough.

The sheeting operation stretched the gluten lengthwise of the direction in which the dough was extended in sheeting the rounded piece of dough and as the sheeting of the dough piece not only stretched the gluten, but also elongated the cells in the dough structure in the direction in which the sheeting operation was carried out, the resulting loaf, after having been baked, had a somewhat grayish appearance on the cut surface due to the fact that the slices cut parallel to the length of the elongated cells thus produced would cause elongated recesses to be present in the face of the slice. Also a core was produced in the center of the loaf.

In order to obtain a lighter color and a better grain structure for the loaf, it has more recently become customary to coil the sheeted dough piece in a direction different from that in which it was sheeted, such as crosswise of the direction of sheeting. This is commonly known as "cross molding." This did not eliminate the core, but the cut slice had a lighter color due to the fact that more light was reflected therefrom because the cells produced were apparently smaller. The apparent smaller cell structure was due to the fact that the bread, when sliced, was cut crosswise through the cells, producing a more rounded opening of the cells through the side face of the slice than was produced by straight molding.

In an attempt to further improve the appearance of the bread when sliced, the twisting of two dough pieces about each other to form a loaf has been done. This twisting is ordinarily done by hand, but any machines that have been developed to accomplish this twisting mechanically have been slow in operation. A disadvantage of twisting, whether manually or by machine, is that the twisting of the one piece of dough on the other causes pressure to be exerted on the sides of the dough pieces that are in contact, producing an undesirable hard or tough portion that is in the nature of a core, extending lengthwise of the molded loaf and present in every slice.

Our improved molding machine includes means for forming an elongated rod-like dough mass of substantially uniform cross section into a molded loaf by coiling the same into axially adjoining coils or turns of substantially the same external diameter and of zero internal diameter, or substantially zero internal diameter.

The rod-like dough mass may be made from an elongated mass of dough that has been molded into a form that is loaf-like. Preferably, the rod-like piece of dough is produced by sheeting a piece of dough in the usual sheeting mechanism of a bread molding machine and coiling it up into a scroll, compacting it under a pressure board, or pressure boards, and then feeding this piece of dough to means that coils the dough piece upon itself in the manner above referred to. The coiling means comprises a conveyor belt and means cooperating therewith, including a flexible member positioned over the belt and means for deflecting the leading end of the rod-like piece of dough away from the conveyor belt, so that the coiling operation is started by the combined action of the conveyor belt and this means for raising the end of the dough piece off the conveyor belt. After the dough piece has been so raised at its end from the conveyor belt the coiling is continued by the combined action of the flexible member positioned over the conveyor belt and the conveyor belt, in its action of moving the rod-like dough piece along with it. However, in order to get the desired helicoidal coiling of the dough piece into the abutting turns, it is necessary that the dough piece be fed to the conveyor belt at an oblique angle to its length.

In our improved machine the compacted scroll of sheeted dough is discharged from the conveyor belt of the compacting means crosswise of this conveyor belt. As this conveyor belt operates transversely to the direction of the conveyor belt that forms part of the means for coiling the rod-like piece of dough into the helicoid, the elongated piece, or rod-like piece of dough, produced by the combined action of the sheeting mechanism, curling chain that produces the scroll, and the pressure boards that compacted the dough piece and elongated it, would extend parallel to the direction of travel of the conveyor belt of the coiling means for forming the helicoidal loaf, if it were discharged directly onto this conveyor belt. In order to obtain the oblique relationship of the elongated dough piece, or rod-like dough piece, with relation to the direction of travel of the said conveyor belt, means is provided for turning the elongated rod-like dough piece so that it will be discharged onto the conveyor belt in a manner that it will extend at an oblique angle to the length thereof, which is the direction of travel of said belt.

It has been found that it is highly desirable to extend the rod-like dough piece by stretching it lengthwise of itself during the feeding of the same to the means for coiling it into a helicoidal shape. Our invention includes such a means for stretching the rod-like piece of dough after it has been turned to the above referred to oblique position and prior to engagement with the means for deflecting the leading end of the dough piece upwardly from the surface of the coiling means conveyor belt. Said stretching means comprises a pair of conveyor belts that operate at different speeds, and rollers cooperating therewith operating at the same speeds as the belts with which they cooperate so that the first conveyor belt and roller encountered by the rod-like dough piece will operate at a slower speed than the second conveyor belt and roller encountered, whereby the desired stretching of the dough piece is obtained, the amount of stretch being dependent upon the difference in speed of the two belts and rollers. The faster of said belts, preferably, is the conveyor belt of the coiling means.

Due to the fact that the piece of dough coiled up into the helicoid by the coiling means has a tendency to uncoil, our machine further includes means for holding the coiled up piece of dough in its coiled condition until it has been deposited in the pan, said means including a flexible member operating over the conveyor belt on which the coiling is done, and which carries the coiled up dough piece to the pan, said flexible member extending into the pan so that the holding action of the flexible member in cooperation with the conveyor belt continues until the dough piece has been confined in the pan in its coiled condition.

It is a purpose of our invention to provide a machine of the above referred to general character that is rapid in operation and which will produce a bread loaf by coiling a rod-like strand or length of dough of approximately uniform cross section into a helicoid having the turns thereof axially adjoining and of approximately the same external diameter and substantially zero internal diameter, and which avoids the disadvantages of twisting mechanisms, such as referred to hereinbefore.

Our machine produces a loaf with a closer knit cell structure than can be obtained by previously known bread molding machines, which has the advantage that the bread can be baked at a lower temperature for a longer period of time, which produces a better flavor than it is possible to obtain from the same dough by other bread molding machines. Also, due to the more closely knit structure of the crust, the tendency of the internal moisture of the loaf to escape is reduced and the tendency of the loaf to dry out is accordingly reduced compared with loaves of bread molded by previously known bread molding machines. This makes the addition of artifical softeners unnecessary.

The coiling operation carried on by our machine strengthens the dough due to the creation of torsion in the dough piece during the coiling operation, which eliminates the necessity of using high priced, high gluten content flours, ordinarily referred to a "strong flours" to provide the necessary strength of the cell structure.

By stretching the dough piece in the stretching mechanism forming a part of our machine, the cells that are in the dough piece are elongated and their axes oriented in the direction of length of the elongated dough strand and the gluten stretched lengthwise of the dough piece. The coiling of the dough strand into the helicoid form places the turns of the coiled dough piece from which the loaf is formed at an oblique angle to the length of the loaf with the elongated cells lying on their sides. When the bread produced by our improved bread molding machine is sliced, the cells, as seen on the faces of the slice, are shallow and elliptical in cross section, rather than round and deep, as would be the case if such coiling of the dough piece had not taken place, producing a silkier texture, brighter crumb and better crust color of the baked loaf. The crust color is the result of the caramelization of the crust, which is increased by the slower, lower temperature of baking that is possible, and this caramelization of the crust creates the improvement in the flavor of the bread loaf. Furthermore, due to the improvement in the cell structure and the position of the cells with respect to the faces of the slices obtained from the loaf made on our machine, a better toast can be made than from bread molded by the ordinary bread molding machines in use prior to our invention.

Other objects and advantages of our invention will appear as the description of the drawings proceed. We desire to have it understood, however, that we do not intend to limit ourselves to the particular details shown or described, except as defined by the claims.

In the drawings:

FIG. 1 is a plan view of our improved bread molding machine.

FIG. 2 is a section taken on the line 2—2 of FIG. 1, on an enlarged scale, partly broken away.

FIG. 3 is a plan view of the turning, stretching and dough strand coiling apparatus of our improved machine, partly broken away, on an enlarged scale.

FIG. 5 is a longitudinal sectional view partly broken away, taken on the line 5—5 of FIG. 3.

FIG. 7 is a section taken on the line 7—7 of FIG. 3, on an enlarged scale, partly broken away.

FIG. 8 is a fragmentary section taken on the line 8—8 of FIG. 7 on a further enlarged scale.

FIG. 10 is a fragmentary sectional view on an enlarged scale, taken on the line 10—10 of FIG. 2.

FIG. 14 is a fragmentary section taken on the line 14—14 of FIG. 3, on an enlarged scale.

FIG. 15 is a fragmentary sectional view on an enlarged scale, taken on the line 15—15 of FIG. 3, and FIG. 16 is a fragmentary vertical section through the stretching roller mounting.

Figure 4:
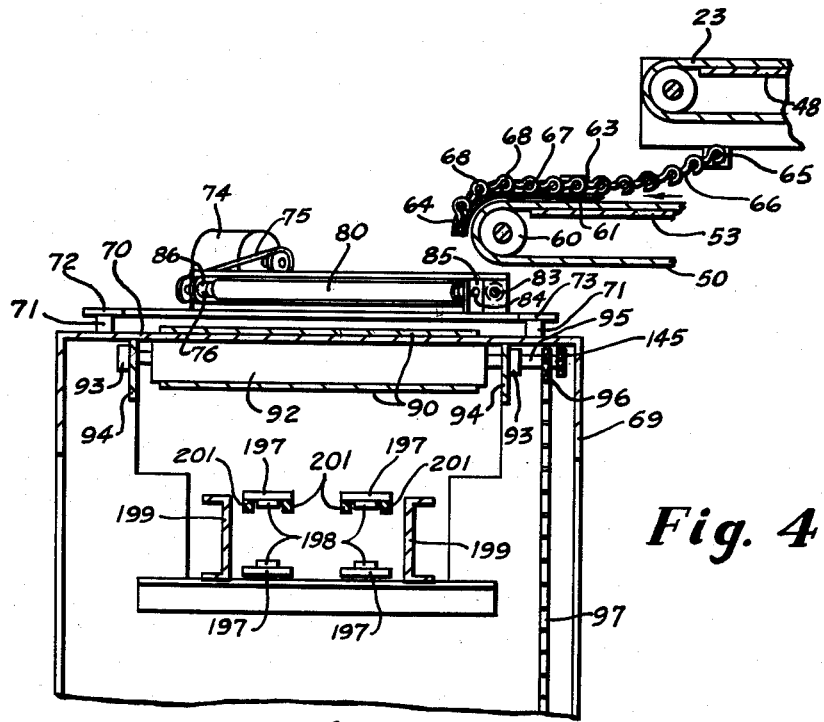
FIG. 4 is a vertical sectional view on an enlarged scale, taken on the line 4—4 of FIG. 3.

Referring in detail to the drawings, in FIG. 1 is shown a bread molding machine made in accordance with our invention, which is provided with a sheeting mechanism 20, into the hopper 21 of which dough balls are fed from any suitable conveying means. The sheeted dough pieces pass from the sheeting rolls of the sheeting mechanism to a conveyor belt 22, which operates at a high speed to project the sheeted dough pieces across a curling conveyor belt 23. Preferably an L-shaped plate 24 is provided, over which the sheeted dough pieces pass in being transferred from the conveyor belt 22 to the belt 23, a suitable deflecting stop member 25 being provided, which is mounted so as to extend over a portion of the plate 24 and over the conveyor belt 23, as shown in FIG. 1. The position of the stop member 25 is adjustable, having a bar 26 extending therefrom that is adjustably mounted in a bracket 27 for locating the stop member at a desired position so as to properly locate the sheeted dough piece 28 on the conveyor belt 23 for cooperation with the curling chain 29, which is mounted on suitable pins 30 on a cross member 31 mounted on the brackets 32, whereby the position of the curling chain 29 lengthwise of the curling conveyor belt 23 and the length of the curling chain 29 in engagement with the curling belt 23 can be adjusted as may be found desirable.

Referring now to FIGS. 1, 2 and 10, mounted on the frame 33 so as to overlie the conveyor belt 23, are the pressure boards 34 and 35, the belt 23 operating in the direction of the arrows shown thereon in FIGS. 1 and 2. The curling chain 29 coils the sheeted dough piece 28 up into a scroll 36 that passes under the pressure boards 34 and 35 so as to be compacted thereby in the usual manner. Said pressure boards are provided with the usual belts 37 operating over the rollers 38 to permit the movement of the belt 37 so as to present a clean surface to the coiled up piece of dough as it passes under the belt 37 on the under side of the backing plate 39. The cross bars 40 are fixed to the upper side of the backing plate 39 and are provided with suitable bearings mounted on the upstanding shafts 41, provided with the hand wheels 42, so as to move up and down therewith, whereby the backing plate 39 can be adjusted up and down relative to the conveyor belt 23. The adjustment is obtained by means of a screw-threaded connection between the lower threaded end of the shaft 41 and the frame 33. The rollers 38 are mounted on brackets 43 provided on the bars 40. The adjustment of the pressure board backing plate 39 is such that the completed scroll 36 shown in FIG. 1, after having left the curling chain 29, will be compacted and extended the desired amount by the two pressure boards 34 and 35 to produce the compacted coiled up piece of dough 44 shown in FIGS. 1 and 2.

Also mounted on the frame 33 are brackets 45, in which the bars 46 are adjustably mounted, guide bars 47 being mounted on the bars 46, there being one of said guide bars 47 on each side of the machine spaced a predetermined distance from the side edge of the conveyor belt 23. The spacing of the guide bars 47 is adjusted so that the coiled up dough piece, that is being compacted by the pressure board with which the guide bars 47 are associated, will extend the coiled up piece of dough so that the ends thereof will engage with the said guide bars 47.

The frame is provided with a top plate or table portion 48, over which the conveyor belt 23 slides, and it will be obvious that the height of the passage between the pressure board and the belt 23 will be determined by the position of the backing plates 39 with relation to the table member 48 provided on the frame 33 of the machine. The conveyor belt 23 is driven in any suitable manner so as to move in the direction indicated by the arrow on FIG. 2, passing over the conveyor roller 49 mounted in suitable bearings on the frame 33.

Mounted on the frame 33 below the belt 23 and extending endwise beyond the same is a conveyor belt 50, which operates over the roller 51 mounted in suitable bearings on the frame 33, said conveyor belt moving in the direction indicated by the arrows in FIG. 2, with the upper run thereof moving in the opposite direction to the upper run of the conveyor belt 23. A pressure board 52 is mounted over the conveyor belt 50 and the upper run of the conveyor belt 50 engages a lower table member or plate 53, over which it slides. The pressure board 52 is made in a similar manner to the pressure boards 34 and 35, having a backing plate 54, which is mounted on the cross bars 55, which are adjustable by means of the shafts 56 having the hand wheels 57, in a similar manner to which the backing plates 39 are adjustable relative to the table member 48, and said pressure board is provided with a belt 58, which is mounted for adjustment on the rollers 59 in a similar manner to that in which the belts 37 are mounted on the rollers 38. Preferably the backing plate 39 of the pressure board 35 is set a little closer to the table 48 than the backing plate 39 of the pressure board 34, and the backing plate 54 of the pressure board 52 is set still closer to the plate 53 than the plate 39 of the pressure board 35 is to the table 48. As a result, the coiled up dough piece is further extended and compacted. Guide bars 47', mounted in a similar manner to the guide bars 47, are provided under the pressure board 52 and are suitably adjusted to provide for the extension in length of the dough piece.

Upon reference to FIG. 1, it will be noted that the conveyor belt 50 extends beyond the conveyor belt 23 at the discharge end of said conveyor belt 50, said conveyor belt operating over the roller 60 at its discharge end. A pair of guide bars 61 is provided, said guide bars being mounted on suitable bars 62 adjustably mounted in the brackets 63 mounted on the frame 33 so that the said guide bars can be spaced any desired distance apart with their length extending longitudinally of the conveyor belt 50, said guide bars having downwardly curved end portions 64, extending along the downwardly curved portion of the conveyor belt 50 where it extends around the roller 60, terminating closely adjacent a position horizontally aligned with the axis of the roller 60, (see FIGS. 3 and 4). Hung from a cross bar 65 is a flexible member 66, which is made up of cross bars 67, that are provided with hook-like members 68 at the ends thereof that pivotally connect with the next adjoining cross bar 67 to thus provide a linked connection between the adjacent cross bars 67 of said flexible member 66, said cross bars 67 extending at right angles to the direction of travel of the conveyor belt 50, the width of the flexible member 66 being substantially equal to the spacing of the guide bars 61 from each other. The purpose of the flexible member 66 is to straighten out the elongated compacted dough piece that is passed under the pressure board 52 so that it will be exactly parallel to the axis of the roller 60 when it leaves the conveyor belt 50.

The elongated rod-like dough piece, that has been produced by the cooperative action of the curling conveyor belt 29 and the pressure boards 34, 35 and 52, is next turned to the proper position for feeding to the coiling means that produces the helically coiled loaf. Referring to FIGS. 1, 3 and 4, the machine is provided with a frame 69 that extends at right angles to the frame 33 and which has a table portion 70, on which a supplemental frame having the foot portions 71 engaging the table is mounted, said supplemental frame being of a T-shaped character having a frame portion 72 and a frame portion 73 extending perpendicularly to the frame portion 72. Mounted on said frame is a motor 74, which is provided with a sprocket over which the chain 75 operates, which also operates over a sprocket provided on a shaft 76, which has mounted to rotate therewith a sprocket 77 with which a chain 78 engages. The chain 78 operates in a suitable arcuate guide 79 provided on the supplemental frame and has the marginal portion of an arcuate belt 80 connected therewith by means of springs 81. Said belt operates over a plurality of freely rotating sleeves 82 provided on the shafts 83 and 84 mounted in suitable brackets 85 and 86 for rotation in said brackets. The shaft 84 is an extension of the shaft 76 and rotates therewith. A plate 87 underlies the upper run of the belt 80 and extends between the bearing members 86 and 85 and between the roller made up of the shaft 84 and the sleeves 82 and a similar roller provided by the shaft 82 and similar sleeves, said plate 87 having downturned flanges 88 at the opposite ends thereof adjacent the rollers for the belt 80 (see FIG. 15). The members 85 and 86 are mounted directly on the supplemental frame and the entire supplemental frame is movable relative to the frame 69 on the table member 70 so that the position of the supplemental frame and its belt can be varied with respect to the frame 69 and the conveyor belt 50, as may be found desirable. The bearing member 86, it will be noted, is an arcuate plate that extends substantially parallel to the free marginal edge 89 of the belt 80.

It will be obvious that as the belt 80 is pulled along its margin 89 by the chain 78 which, of course, also operates over a sprocket at the end thereof opposite the sprocket 77, an elongated rod-like piece of dough that has been acted on by the pressure board 52 and the belt 50 and has been discharged from the end of the belt 50 onto the belt 80, will be turned by the action of the belt 80 so that it will be discharged from the discharge end of the belt 80 in a position that is substantially parallel to the axis of the shaft 84 and will be deposited in such an angular position on a conveyor belt 90 as said shaft 84 has to the direction of travel of said conveyor belt 90. The conveyor belt 90 extends over the belt 80 at its discharge end, as will be obvious from FIG. 4.

Figure 9:
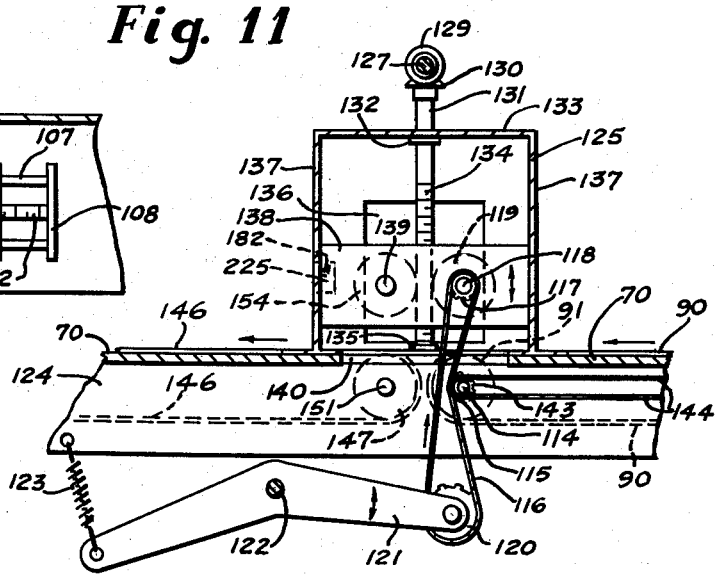
FIG. 9 is a fragmentary section taken on the line 9—9 of FIG. 7 on an enlarged scale.
Figure 13:
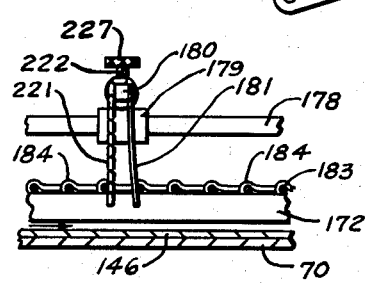
FIG. 13 is a fragmentary longitudinal sectional view showing a modified form of deflecting means for the leading end of the dough strand.

The belt 90 operates over the conveyor roller 91 shown in FIG. 9 and over the conveyor roller 92 shown in FIG. 4, the roller 91 being the driven roller. Said roller 92 is mounted in suitable bearings 93 provided on the depending bracket 94, provided on the framework 69.

Figure 11:
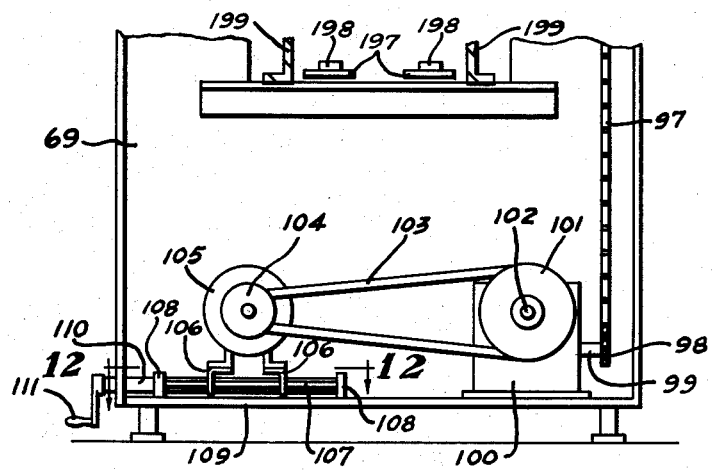
FIG. 11 is a fragmentary sectional view showing the variable speed driving means for one of the belts and rollers of the dough strand stretching means.
Figure 12:
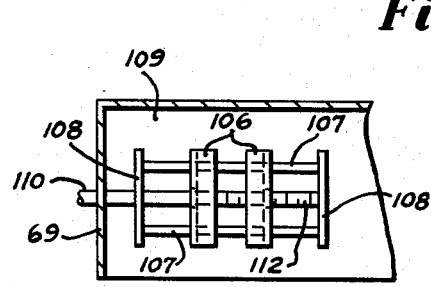
FIG. 12 is a fragmentary section taken on the line 12—12 of FIG. 11.

A shaft 95, which has a sprocket 96 thereon over which the sprocket chain 97 operates, is mounted in suitable bearings on the frame 69. Referring to FIG. 11, it will be noted that the sprocket chain 97 operates over a sprocket 98, which is mounted on the output shaft 99 of a reduction gearing 100, which is provided with a pulley 101 provided on the input shaft 102 thereof. The pulley 101 has a belt 103 driving the same, which belt operates over a variable speed pulley 104 driven by the motor 105, which is mounted on a pair of cross members 106, that are longitudinally slidably mounted on a pair of rods 107 that are mounted between a pair of brackets 108 mounted on a cross frame member 109 provided on the frame 69 (see FIG. 12). A shaft 110 is rotatably mounted in the bracket 108 and is provided with a crank 111 and has a screw-threaded portion 112 that has screw-threaded engagement with one of the brackets 106.

It will be obvious that by rotation of the crank 111 the motor 105 can be moved longitudinally of the rods 107 toward and away from the pulley 101. The variable speed pulley is of such a character that as the variable speed pulley 104 and the motor 105 are moved away from the pulley 101 the speed of the shaft 102 will be decreased as the effective diameter of the variable speed pulley 104 will be decreased, and the speed of the shaft 102 will be increased as the motor 105 is moved toward the pulley 101. Thus the speed of the conveyor belt 99 can be controlled by means of the crank 111, which adjusts the variable speed mechanism.

The elongated dough piece discharged from the belt 50 onto the belt 80 and from the belt 80 onto the belt 90 is shown in FIGS. 1 and 3 in the position that it has upon having been deposited on the belt 90, said dough piece being indicated by the numeral 113. Referring to FIG. 9, the roller 91 over which the conveyor belt 90 operates, is provided with a shaft 114 that rotates with said roller, and a sprocket 115 is mounted on said shaft, which also rotates with the shaft 114 and thus with the roller 91. A sprocket chain operates over the sprocket 115 and over a sprocket 117 that is provided on a shaft 118, with which a roller 119 rotates. Said sprocket chain also operates over an idler sprocket 120, which is mounted on a bell crank lever 121 that is swingable about a pivot 122 extending across the frame 69 and which is provided with a spring 123 connected with the extremity thereof opposite that on which the idler roller 120 is mounted, which engages a suitable opening in a depending flange 124 on the frame 69, said spring 123 being under tension so as to put the desired tension on the sprocket chain 116. The sprockets 115 and 117 are of the same size and have the same number of teeth, Thus the roller 119 is rotated at the same surface speed as the roller 91 and has the same surface speed as the belt 90.

The shaft 114 is mounted in bearings provided on the depending flanges 124 on the table member 70 and has a sprocket 143 mounted thereon to rotate therewith. Said sprocket is driven by means of a sprocket chain 144, which also passes over the sprocket 145 mounted on the shaft 95 to rotate therewith. Thus the roller 91 is driven from the motor 105 through the variable speed pulley device 104, (see FIG. 4, FIGS. 7 to 9 inclusive, and FIG. 11).

Referring now to FIGS. 1, 7, 8 and 9, mounted on the frame 69 is a pair of housings 125. Provided on said housings are upstanding brackets 126 in which a shaft 127 is adapted to rotate, said shaft being rotatable by means of a crank 128. Mounted on the shaft 127 to rotate therewith are bevel gears 129, which mesh with bevel gears 130, which are mounted to rotate with the shafts 131, said shafts being mounted in bearings 132 in the cross members 133 of the housings 125.

Each of said shafts 131 rotate in a thrust bearing 135 and has a screw-threaded portion 134 that engages in a screw-threaded opening in a block 138, which is mounted for guided sliding movement in the housing 125 between walls 137 of said housing and against rotation. Thus as the shaft 131 is rotated by means of the crank 128 the block 138 will be moved up or down, dependent upon the direction of rotation of the crank 128. The blocks 138 are provided with bearings for the shaft 118 and a shaft 139, the purpose of which will be described below, said shafts extending through openings 136 in the housings 125. The spacing of the roller 119 from the belt 90 can thus be determined by adjustment of the same through the crank 128. The table 70 is provided with a suitable opening 140, through which the sprocket chain 116 extends and in which the roller 91 is mounted.

A conveyor belt 146 also operates over the plate-like member 70 in longitudinal adjacency to the conveyor belt 90, extending through the opening 140 from the conveyor roller 147, (see FIGS. 8 and 9). Said table 70 also has a downwardly inclined portion 148 and the conveyor belt 146 also extends around a roller 149 of much smaller diameter than the roller 147 adjacent the bottom end edge 150 of said downwardly inclining portion 148 of the table or plate member 70. Said conveyor belt 146 extends down the inclined portion 148, operating in the direction of the arrow shown in FIG. 5, and around the roller 149. Said conveyor belt 146 is driven by any suitable driving means at a uniform rate, said driving means being located at any desired location along the lower run of the belt 146 between the ends of said lower run.

The roller 147 is mounted on a shaft 151 to rotate therewith and a sprocket 152 is mounted on said shaft 151 to rotate therewith. A sprocket 153 is mounted on the shaft 139 to rotate therewith and a roller 154 is also mounted on the shaft 139 to rotate therewith, (see FIGS. 8 and 9). A sprocket chain 155 operates over the sprocket 151 and over the sprocket 154 and extends around the idler sprocket 156, which is mounted on a bell crank lever 157, which is mounted in the same manner as the bell crank lever 121 on a pivot 158 and operates in the same manner as the bell crank lever 121 to maintain tension on the sprocket chain 155 for any position of the sprocket 153 and roller 154.

It will be obvious that the rollers 154 and 119 will be movable up and down with the blocks 138 by adjustment of the position of said blocks in the housings 125 by means of the crank 128. Accordingly the rollers 154 and the conveyor belt 146 will rotate at the same surface speed, the rollers 147 and 154 being of the same diameter, and the conveyor belt 90 and the roller 119 will rotate at the same surface speed, but the speed of the roller 119 and of the conveyor belt 99 can be adjusted by means of the variable speed mechanism, while the rate of travel of the belt 146 and rate of rotation of the roller 154 will always be the same. The variable speed mechanism is adjusted in the operation of the machine to move the belt 90 and rotate the roller 119 at a slower rate than that of the belt 146 and the roller 154. Accordingly, when the elongated dough piece 113 engages with the roller 154 and the belt 146, the higher speed of said roller and belt will cause the lengthwise pulling or stretching of the dough piece 113 as it passes from the roller 119 and belt 90 to the roller 154 and belt 146.

Figure 6:
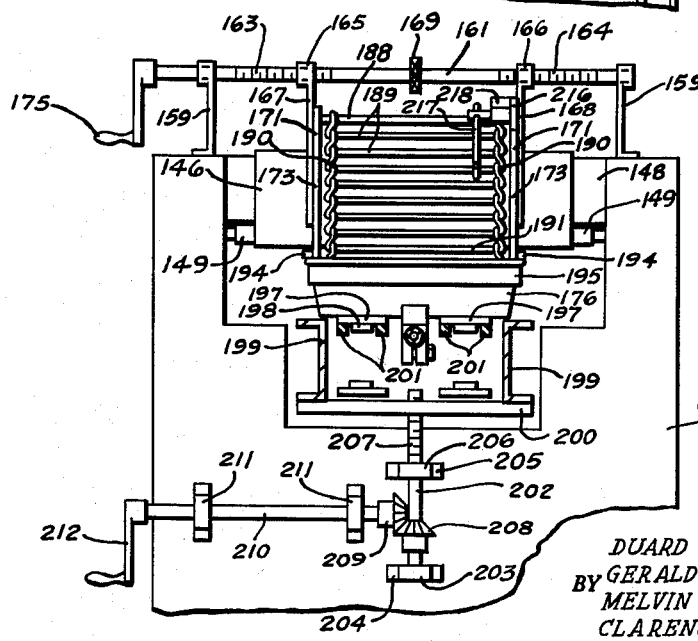
FIG. 6 is a section taken on the line 6—6 of FIG. 3, on an enlarged scale, partly broken away.

Mounted on the table member 70 are upstanding brackets 159 and 160, that are provided with bearings for shafts 161 and 162. Each of said shafts has oppositely screw-threaded portions 163 and 164 (see FIG. 6), with which screw-threaded bosses 165 and 166 on the brackets 167 and 168 screw-threadedly engage. One of said shafts, such as the shaft 161, is provided with a crank for rotating the same and each of the shafts 161 and 162 is provided with a sprocket 169, with which a sprocket chain 170 engages, whereby the two shafts 161 and 162 will be rotated together by the crank in the same direction.

The brackets 167 and 168 are provided on a pair of guide rails 171, each of said guide rails having a reduced portion 172 and a downwardly inclined portion 173, the reduced portion 172 being at the end of the guide rails 171 nearest the roller 154 and having outwardly inclined entrance ends 174, to thus provide a pair of guide rails that have forward portions 172 that are of less height than the rear portions thereof and that have downwardly inclined portions 173 that extend downwardly at the same angle as the downwardly inclined portion of the table 148.

By turning the shafts 161 and 162 in a suitable direction by means of the crank 175, the transverse spacing of the guide bars 171 can be adjusted to either a greater or lesser spacing than that shown in FIGS. 1 and 3 of the drawings. The spacing of said guide bars is adjusted in accordance with the size of the loaf that is to be molded on the machine so as to properly guide the loaf into a pan, the pan being shown at 176 in FIGS. 3 and 5 of the drawings.

A pair of brackets 177 is also mounted on the table 70 and a rod-like member 178 extends between said brackets. Mounted on the rod-like member 178 for longitudinal sliding adjustment thereon is a bracket 179, from which an arm extends. A flexible deflecting member 181 depends from the arm 180. Said arm 180 is slidably adjustable lengthwise in the bracket 179 and thus the position of the flexible member 181 with respect to the conveyor belt 146 and with respect to the roller 154 can be adjusted both lengthwise of said conveyor belt and transversely thereof. Said bracket has the clamping screws 226 and 227 for holding the bracket and arm in adjusted position. The flexible member 181 may be made of belting or any other suitable flexible material.

A rod-like member 182 extends between the housings 125, being mounted in brackets 225 provided on the inner end walls thereof. Hung from the rod-like member 182 is a flexible member, which is made up of the cross bars 183, which are provided at the ends thereof with hook-like members 184 that engage with the next adjacent cross bar 183 so as to provide a linked connection between the adjacent cross bars. The hook-like members 184 on the first of said cross bars 183 engage the rod-like member 182 to suspend the end of the linked flexible member having the cross bars 183 therefrom at the end thereof adjacent the roller 154. Sair cross bars 183 are longer than the distance between the guide bars 171 and rest on the top edges of the reduced portions 172 of said guide bars 171 (see FIG. 14), with the hook-like portions 184 located laterally outwardly beyond said guide bars. In order to provide for this relationship between the flexible member made up of the cross bars 183 linked together by the hooks 184, such flexible members of different widths may be provided in order that they will bridge the reduced portions 172 of the guide bars for any adjusted spacing thereof that may be desired. The flexible deflector member 181 extends down between a pair of said cross bars 183 to a point closely adjacent the top surface of the belt 146, the bottom edge 185 of said flexible member 181 preferably being slightly spaced from the top surface of the conveyor belt 146. The flexible member, as will be obvious from FIG. 5, that rests on said reduced portions 172 of the guide bars 171 extends substantially to the offset 186 between the higher portion of said guide bars 171 and said reduced portion 172 thereof. It will thus be obvious that the cross bars 183 of said flexible member are spaced from the conveyor belt 146 substantially the height of the portions 172 of the guide bars 171.

The elongated rod-like dough piece, after it has been stretched by the action of the rollers 154 and 119 and the conveyor belts 146 and 90, is elongated still more than was the case when it was deposited on the conveyor belt 99 at the oblique angle shown in FIGS. 1 and 3. The rollers 119 and 154 are adjusted in position with respect to the conveyor belts 90 and 146 so that the same will firmly engage with the dough piece 113 that is being stretched by the action of said rollers, but the adjustment is preferably such that while the dough piece will be firmly gripped between the roller 119 and belt 90 and between the roller 154 and the belt 146, it will not be flattened to any substantial extent by the action of said rollers, being substantially cylindrical in cross section as it passes from the roller 154 under the flexible member having the cross bars 183. The flexible member 181 is preferably adjusted to have a position near the reduced portion 172 of the guide member that is on the side of the machine that has the advancing end 187 of the dough piece 113 adjacent the same. Accordingly, when the dough piece 113, which has been extended by the stretching action of the rollers and belts above referred to, reaches the location of the flexible member 181, said advancing end 187 will be turned up as shown in FIG. 5, as the said end 187 will continue to be turned up away from the conveyor belt 146 to start the coiling up of the dough piece in a helicoidal form, said upturning by means of the flexible member 181 continuing until sufficient dough has been turned over at the advancing end of the dough piece 113 to raise it into engagement with the flexible member having the cross bars 183, whereupon the flexible member takes over the coiling action due to its retarding action on the dough piece, which is being advanced continuously by the belt 146. It will be obvious that the position of the flexible member 181 will determine the point along the travel of the conveyor belt 146 where the coiling up of the dough piece into the helicoid begins.

A rod-like member 188 is provided between the guide bars 171, being mounted thereon adjacent the shoulder 186, and a flexible member, similar to the flexible member mounted on the reduced portions 172 of the guide bars, is mounted on said rod-like member 188 in a similar manner to that in which the previously referred to flexible member is mounted on the rod-like member 182, said flexible member having the cross bars 189 and the hook-like members 190 for flexibly connecting the adjacent rod-like members 189 to form the said flexible member. Said flexible member rests on the conveyor belt 146, extending along the portion thereof that overlies the horizontal portion of the table 70, and also that overlies the downwardly inclined portion 148 of said table. Said flexible linked member has a depending portion 191, which extends over the portion of the belt 146, extending around the roller 149 downwardly a short distance into the pan 176, which is in position to receive a loaf from the molding machine. The guide bars 171 also have portions 192 that extend beyond said portion of the belt that extends around said roller 149, and said extensions each have a depending portion 193, which is provided with a stop flange 194 for engagement of the top edge of the pan 176 therewith, as explained below.

The pan 176 is one of a group of pans that is connected together by the usual strap 195 and is mounted on a pan conveyor 196, said pan conveyor comprising flat plate-like members 197, which are connected together by pivot members that are mounted in hinge lugs 198 provided on said plate-like members 197. Said pan conveyor is mounted on a frame having the longitudinal channel members 199, and said frame is so mounted that it is adapted to be adjusted by means of adjusting means connected with the cross member 200 that connects the channel members 199 substantially below the location of the pan 176. Suitable guide rods 201 for the linked conveyor members having the plate-like body portions 197, are provided on the frame having the longitudinal frame members 199.

The adjusting means for the conveyor frame comprises a shaft 202, which is mounted in a thrust bearing 203 provided on a bracket 204 mounted on the frame 69, and a bracket 205, also mounted on the frame 69, is provided with a bearing 206 for the shaft 202. Said shaft 202 has a screw-threaded portion 207 that engages in a screw-threaded opening in the cross member 200 on the conveyor frame.

The means for rotating the shaft 202 to adjust the height of the frame for the pan conveyor comprises a bevel gear 208 mounted on the shaft 202 to rotate therewith, which meshes with the bevel gear 209 mounted on the shaft 210 to rotate therewith, said shaft 210 being mounted in suitable bearings 211 provided on brackets mounted on the frame 69. A crank 212 is provided for rotating the shaft 210. It will be noted that the position of the end of the conveyor pan frame that underlies the pan 176 can be adjusted up and down by means of the rotation of the crank 212. In the operation of the molding machine, it is highly desirable that a close and accurate position of the top edge of the pan 176 be obtained with respect to the conveyor belt 146 where it extends around the roller 149. In order to get such close adjustment, the stop flanges 194 are provided on the guides 173, the adjustment being preferably such that the top edge of the pan, such as the pan 176, will engage with the stop flanges 194 slidably as the pans pass under said flanges, this providing for positioning of the pan 176 so that it will have the proper amount of the depending portion 191 of the flexible member overlying the belt 146 extending into the same for properly delivering the coiled up dough piece to the pan while holding it from uncoiling.

Mounted on a transverse shaft extending between the frame members 199 is a sleeve 213 which has the arm 214 extending therefrom. Said arm has the pan stop member 215 mounted thereon for adjustment longitudinally of said arm. Mounted on a bracket 216 on the frame 69 (said bracket being shown as being mounted on one of the brackets 168), is a pan stop actuating member 217, said pan stop actuating member 217 being mounted so as to operate a switch 218 mounted on the bracket 216 to actuate suitable mechanism for quickly pulling the arm 214 downwardly and thus releasing the stop member 215 from the pan 176, said pans advancing to the pan conveyor after such release. The stop member 215 immediately returns to an up position and, should it not be clear of the bottom 219 of the pan 176 when it returns to an up position, the inclined face 220 thereof will, after the bottom of the pan 219 has cleared said finger, cause the stop finger 215 to move into a position between the pan 176 and the next pan to halt it in a position corresponding to that shown for the pan 176 in FIG. 5, the pans being successively moved into the position shown for the pan 176 by the operation of the pan stop operating member 217 in this manner. The pan stop operating member 217 is swung upwardly to operate the switch 218 to bring about this movement of the pan stop member 215 out of holding position due to engagement of the flexible member having the cross members or cross bars 189 thereon with said pan stop member 217 as the loaf that is being acted on by the said flexible member passes under that portion of the flexible member that lies below said pan stop 217.

The flexible member 181 ordinarily has sufficient retarding action to cause the advancing end 187 of the dough piece 113 to be turned up in the manner shown in FIG. 5. For ordinary doughs that are somewhat slack, this is all that is necessary to turn up the end of the dough piece. However, when stiffer doughs are being acted on by the molding machine, additional retarding means may be provided in the form of a chain mesh member 221, which may be mounted on the arm 189 by engagement with the upstanding pins 222 provided thereon, the combined action of the chain mesh member 221 and the flexible member 181 then acting on the dough piece to turn up the leading end thereof. The flexible member mounted on the transverse rod-like member 188 is detachable therefrom, and it is to be understood that the width of the flexible member is preferably such as to be capable of passing down into position in engagement with the conveyor belt 146 between the guide bars 171. Should it be necessary to adjust the spacing of the guide bars 171 so that the flexible member having the cross bar 189 will not pass down in between the same, a narrower flexible member may be substituted for the one shown in the drawings.

In the operation of our loaf coiling bread molding machine the rounded pieces of dough that are to be molded into loaves are introduced into the hopper 21 at regular spaced intervals and are sheeted and deposited from the discharge conveyor 22 of the sheeting mechanism onto the conveyor belt 23 to substantially the position shown for the dough piece 28 in FIG. 1. The sheeted dough then passes under the curling chain 29 to form the scroll shown at 36, which then passes under one or more pressure boards, such as the pressure boards 34 and 35, located over the conveyor belt 23 to elongate the dough piece as shown at 44 in FIG. 1. From the conveyor belt 23 the elongated dough piece 44 drops onto the conveyor belt 50, operating in the opposite direction to the conveyor belt 23, and passes under the pressure board 52 where it is further elongated. The elongated dough piece 113 resulting is then turned so as to have a position such as shown in FIG. 1 by means of the turning conveyor 80, and is thus deposited on the conveyor belt 90 with the end 187 thereof leading and with the longitudinal axis of the dough piece 113 extending at an angle of approximately 35 degrees to the direction of travel of the conveyor belt 90. The said dough piece 113 then passes through the stretching mechanism made up of the rollers 119, 154, conveyor belt 90 and conveyor belt 146 so as to further extend the piece of dough and stretch the same so as to give it the desired quality for coiling up on itself by the coiling means, which comprises the deflecting member 181 and the flexible member having the cross bars 183, as well as the flexible member having the cross bars 189. The deflecting member 181 is located in such a position that the dough piece will be completely coiled up on itself by the time it reaches the end of the conveyor at which the conveyor belt 146 passes around the roller 149.

It is highly undesirable to have additional coiling action take place after the dough piece has been completely coiled up into the helicoid, as this would destroy the helicoidal character of the loaf. Accordingly the flexible member 181 is so positioned lengthwise of the conveyor belt 146 that the coiling will be completed substantially when the loaf reaches a position above the conveyor roller 149. Due to the fact that the coiling up of the dough piece in the manner that is accomplished by our improved machine puts a torsional stress on the elongated piece of dough, it has a tendency to uncoil unless it is held from uncoiling until it is confined within the pan. Also, due to the fact that the conveyor belt 146 is operating at high speed, there is a tendency for the coiled up dough piece to be projetced outwardly from the conveyor belt toward the right as viewed in FIG. 5. In order to prevent this and the uncoiling of the coiled up piece of dough, the depending portion 191 of the flexible member is provided for holding the dough piece in its coiled condition until it is well within the confines of the pan 176 and also to prevent the coiled up dough piece from being projected beyond the center of the pan when it leaves the conveyor belt 146. A dough piece in partly coiled up condition is shown in FIG. 3, the coiled portion being shown at 223. The coiling continues in the manner shown at 223 until the trailing end 224 of the dough piece is reached.

What we claim is:

1. In a bread molding machine, means for curling a sheeted dough piece into a scholl, means for compacting and elongating said scroll into an elongated dough piece of substantially uniform cross section, coiling means, and means for advancing said elongated dough piece into engagement with said coiling means at an oblique angle to its length including means for stretching said dough piece lengthwise of itself, comprising rollers delivering said dough piece to said coiling means and means for feeding said dough piece endwise to said rollers at an oblique angle to their axes.

2. In a bread molding machine, means for forming an elongated rod-like dough piece, and means for coiling said elongated dough piece into a molded loaf composed of axially abutting turns thereof comprising a conveyor belt, means for feeding said dough piece endwise onto said conveyor belt to extend at an oblique angle to the direction of travel thereof, a flexible member positioned over and extending longitudinally of said conveyor belt in upwardly spaced relation thereto and means extending downwardly from said flexible member toward said belt engaging the leading end of said dough piece to initiate coiling thereof.

3. In a bread molding machine, means for forming an elongated rod-like dough piece, and means for coiling said elongated dough piece into a molded loaf composed of axially abutting turns thereof comprising a conveyor belt, means for feeding said dough piece endwise onto said conveyor belt to extend at an oblique angle to the direction of travel thereof, a stationary flexible member positioned over and extending longitudinally of said conveyor belt in spaced relation thereto and means extending downwardly from said flexible member toward said belt engaging the leading end of said dough piece to raise said leading end off said belt and initiate coiling thereof.

4. In a bread molding machine, means for forming an elongated rod-like dough piece, and means for coiling said elongated dough piece into a molded loaf composed of axially abutting turns thereof comprising a conveyor belt, means for feeding said dough piece endwise onto said conveyor belt to extend at an oblique angle to the direction of travel thereof, a flexible member extending longitudinally of said conveyor belt in upwardly spaced relation thereto and means extending downwardly from said flexible member toward said belt engaging the leading end of said dough piece to initiate coiling thereof.

5. In a bread molding machine, means for forming an elongated rod-like dough piece, and means for coiling said elongated dough piece into a molded loaf composed of axially abutting turns thereof comprising a conveyor belt, means for feeding said dough piece endwise onto said conveyor belt to extend at an oblique angle to the direction of travel thereof including means for stretching said dough piece, a flexible member positioned over said conveyor belt and extending longitudinally thereof in upwardly spaced relation thereto and means extending downwardly from said flexible member toward said belt engaging the leading end of said dough piece to initiate coiling thereof.

6. In a bread molding machine, means for forming an elongated rod-like dough piece, and means for coiling said elongated dough piece into a molded loaf composed of axially abutting turns thereof comprising a conveyor belt, means for feeding said dough piece endwise onto said conveyor belt to extend at an oblique angle to the direction of travel thereof, a flexible member positioned over and extending longitudinally of said conveyor belt in upwardly spaced relation thereto and means extending downwardly from said flexible member toward said belt engaging the leading end of said dough piece to initiate coiling thereof, means for positioning a pan below the discharge end of said conveyor belt and means cooperating with said belt to hold said coiled dough piece from uncoiling extending from said flexible member to said pan.

7. In means for coiling an elongated dough piece into a molded loaf composed of axially abutting turns, a conveyor belt, means for feeding said dough piece onto said belt to extend at an oblique angle to the direction of travel thereof, a pair of transversely spaced bars extending longitudinally of said belt over the same, a linked flexible member extending longitudinally of said belt and bridging the space between said bars to space said flexible member upwardly from said belt and means extending downwardly from said flexible member toward said belt engaging the leading end of said dough piece to raise said leading end off said belt and initiate coiling thereof.

8. In means for coiling an elongated dough piece into a molded loaf composed of axially abutting turns, a conveyor belt, means for feeding said dough piece onto said belt to extend at an oblique angle to the direction of travel thereof, a pair of transversely spaced bars extending longitudinally of said belt over the same, a linked flexible member extending longitudinally of said belt and bridging the space between said bars to space said flexible member upwardly from said belt and a flexible deflector depending below said flexible member adjacent one of said bars and extending toward said belt.

9. In a bread molding machine, means for forming an elongated rod-like dough piece, and means for coiling said elongated dough piece into a molded loaf composed of axially abutting turns thereof comprising a conveyor belt, means for feeding said dough piece endwise onto said conveyor belt to extend at an oblique angle to the direction of travel thereof, a stationary flexible member positioned over and extending longitudinally of said conveyor belt in upwardly spaced relation thereto and means extending downwardly from said flexible member toward said belt engaging the leading end of said dough piece to raise said leading end off said belt and initiate coiling thereof, said last mentioned means being adjustable longitudinally of said conveyor belt.

10. In means for coiling an elongated dough piece into a molded loaf composed of axially abutting turns, a conveyor belt, means for feeding said dough piece onto said belt to extend at an oblique angle to the direction of travel thereof, a pair of transversely spaced bars extending longitudinally of said belt over the same, means for mounting said bars for adjustment transversely of said belt, a linked flexible member extending longitudinally of said belt and bridging the space between said bars to space said flexible member upwardly from said belt and means extending downwardly from said flexible member toward said belt engaging the leading end of said dough piece to raise said leading end off said belt and initiate coiling thereof.

11. In means for coiling an elongated dough piece into a molded loaf composed of axially abutting turns, a conveyor belt, means for feeding said dough piece onto said belt to extend at an oblique angle to the direction of travel thereof, a pair of transversely spaced bars extending longitudinally of said belt over the same, said bars each having an offset therein to provide a low portion and a high portion on each thereof, a linked flexible member extending longitudinally of said belt and bridging the space between the low portions of said bars to space said flexible member upwardly from said belt, a flexible member extending downwardly through said linked member and cooperating with said belt to lift the leading edge of said dough piece to initiate coiling thereof, and a flexible member extending longitudinally of said belt over the same between the high portions of said bars.

12. In means for coiling an elongated dough piece into a molded loaf composed of axially abutting turns, a conveyor belt, means for feeding said dough piece onto said belt to extend at an oblique angle to the direction of travel thereof, a pair of transversely spaced bars extending longitudinally of said belt over the same, said bars each having an offset therein to provide a low portion and a high portion on each thereof, a linked flexible member extending longitudinally of said belt and bridging the space between the low portions of said bars to space said flexible member upwardly from said belt, a flexible member extending downwardly through said linked member and cooperating with said belt to lift the leading edge of said dough piece to initiate coiling thereof, means for positioning a pan below the discharge end of said conveyor belt, and a flexible member extending longitudinally of said belt over the same between the high portions of said bars and into said pan.

13. In a bread molding machine, means for curling a dough sheet into a scroll, means for compacting and elongating said scroll into an elongated dough piece of substantially uniform cross section, coiling means, a conveyor belt, means for feeding said dough piece endwise onto said conveyor belt to extend at an oblique angle to the direction of travel thereof, a flexible member positioned over and extending longitudinally of said conveyor belt in upwardly spaced relation thereto, and means extending downwardly from said flexible member toward said belt engaging the leading end of said dough piece to initiate coiling thereof.

14. In a bread molding machine, means for curling a dough sheet into a scroll, means for compacting and elongating said scroll into an elongated dough piece of substantially uniform cross section, coiling means, a conveyor belt, means for feeding said dough piece onto said belt to extend at an oblique angle to the direction of travel thereof, a pair of transversely spaced bars extending longitudinally of said belt over the same, means for mounting said bars for adjustment transversely of said belt, said bars each having an offset therein to provide a low portion and a high portion on each thereof, a linked flexible member extending longitudinally of said belt and bridging the space between the low portions of said bars to space said flexible member upwardly from said belt, a flexible member extending downwardly through said linked member and cooperating with said belt to lift the leading edge of said dough piece to initiate coiling thereof, said depending flexible member being adjustable longitudinally of said belt, and a flexible member extending longitudinally of said belt over the same between the high portions of said bars.

15. In a bread molding machine, means for forming an elongated dough mass of substantially uniform circular cross section, coiling means comprising a stationary elongated flexible member and means for engaging said dough mass progressively lengthwise of said dough mass with said flexible member, comprising means for continuously advancing said dough mass lengthwise of said flexible member under the same with the longitudinal axis of said mass extending at a constant oblique angle to its direction of advancement and deflecting means extending upwardly from said advancing means toward said flexible member in the path of the forward end of said dough mass as it is advanced by said advancing means to turn said end upwardly toward said flexible member.

16. In a bread molding machine, means for forming an elongated dough mass of substantially uniform circular cross section, coiling means comprising a stationary elongated flexible member comprising flexibly connected cross bars and means for engaging said dough mass progressively lengthwise of said dough mass with said flexible member, comprising means for continuously advancing said dough mass lengthwise of said flexible member under the same with the longitudinal axis of said mass extending at a constant oblique angle to its direction of advancement and deflecting means extending upwardly from said advancing means toward said flexible member in the path of the forward end of said dough mass as it is advanced by said advancing means to turn said end upwardly toward said flexible member.

17. In a bread molding machine, means for curling a sheeted dough piece into a scroll, means for compacting and elongating said scroll into an elongated dough piece of substantially uniform cross section, said last mentioned means discharging said dough piece therefrom with its axis extending transversely of its direction of discharge, coiling means, means for advancing said elongated dough piece into engagement with said coiling means and means for depositing said elongated dough piece on said advancing means with its axis extending obliquely to the direction of travel of said advancing means, comprising paired rollers delivering said dough piece to said advancing means, said rollers having their axes of rotation extending transversely to the direction of travel of said advancing means and means for feeding said dough piece to said rollers with its axis at an oblique angle to the axes of said rollers comprising transfer means between said rollers and said compacting and elongating means receiving said dough piece from said compacting and elongating means and comprising means for turning said elongated dough piece through an oblique angle prior to discharge therefrom into said paired rollers.

18. In a bread molding machine, means for forming an elongated rod-like dough mass of substantially uniform cross section, an upper member and a lower member spaced apart a distance greater than said cross section, one of said members being movable with respect to the other member along a given path, power means connected to the movable member to move it along said path, means for introducing said mass between said members with the elongated dimension of the mass at an oblique angle to said path, and means mounted between said members in a position to engage an end of said mass while between said members and to turn said end up into contact with the upper member.

19. In a bread molding machine, means for forming an elongated rod-like dough mass of substantially uniform cross section, an upper member and a lower member spaced apart a distance greater than said cross section, one of said members being movable with respect to the other member along a given path, power means connected to the movable member to move it along said path, said upper member having downwardly extending ridges extending normal to said path, means for introducing said mass between said members with the elongated dimension of the mass at an oblique angle to said path, and means mounted between said members in a position to engage an end of said mass while between said members and to turn said end up into contact with the upper member.

References Cited in the file of this patent

UNITED STATES PATENTS

| | | |
|---|---|---|
| 1,126,606 | Wolf | Jan. 26, 1915 |
| 1,792,672 | Zaiss | Feb. 17, 1931 |
| 2,119,673 | Gielow | June 7, 1938 |
| 2,259,476 | MacManus | Oct. 21, 1941 |
| 2,591,546 | Hettinger | Apr. 1, 1952 |
| 2,671,416 | Steadman | Mar. 9, 1954 |
| 2,746,401 | Archer | May 22, 1956 |
| 2,767,665 | Bestoso | Oct. 23, 1956 |

FOREIGN PATENTS

| | | |
|---|---|---|
| 161,726 | Australia | Mar. 4, 1955 |
| 519,453 | Great Britain | Mar. 27, 1940 |